(12) United States Patent
Finne et al.

(10) Patent No.: US 8,568,830 B2
(45) Date of Patent: Oct. 29, 2013

(54) METHOD FOR MANUFACTURING COATED PIPES

(75) Inventors: Mikael Finne, Kvevlax (FI); Jonas Holmlund, Oravais (FI); Charlotta Risku, Vasa (FI); Stefan Slotte, Vasa (FI)

(73) Assignee: Oy KWH Pipe Ab, Vasa (FI)

( * ) Notice: Subject to any disclaimer, the term of this patent is extended or adjusted under 35 U.S.C. 154(b) by 880 days.

(21) Appl. No.: 11/816,891

(22) PCT Filed: Feb. 23, 2006

(86) PCT No.: PCT/FI2006/050078
§ 371 (c)(1),
(2), (4) Date: Mar. 25, 2008

(87) PCT Pub. No.: WO2006/090016
PCT Pub. Date: Aug. 31, 2006

(65) Prior Publication Data
US 2009/0098296 A1  Apr. 16, 2009

(30) Foreign Application Priority Data
Feb. 23, 2005  (FI) ...................................... 20050210

(51) Int. Cl.
*B05D 3/04* (2006.01)
(52) U.S. Cl.
USPC ............. 427/314; 427/128; 427/356; 118/50; 118/400; 118/410
(58) Field of Classification Search
USPC ............. 427/294, 356, 128; 118/50, 400, 410
See application file for complete search history.

(56) References Cited

U.S. PATENT DOCUMENTS

| 4,370,187 A | * | 1/1983 | Katagiri et al. ........... 156/244.23 |
| 4,515,737 A | | 5/1985 | Karino et al. |
| 5,082,613 A | * | 1/1992 | Kasakevich et al. ...... 264/178 R |

(Continued)

FOREIGN PATENT DOCUMENTS

| EP | 0 556 665 | 2/1993 |
| GB | 1 201 735 | 8/1970 |

(Continued)

OTHER PUBLICATIONS

Harget et al. "Developments in Plastics Pipe Technology and Trenchless Installation"; Pipelines and Gas Journal; Dec. 2001; 4 pages.

*Primary Examiner* — Timothy Meeks
*Assistant Examiner* — Nathan T Leong
(74) *Attorney, Agent, or Firm* — Seppo Laine Oy; Joshua P. Wert

(57) ABSTRACT

The invention concerns a method for manufacturing pipes coated with a peelable protection layer, wherein the core pipe (1) is produced by extruding and calibrating, after which the surface of core pipe (1) is heated before a protecting coating layer (7a) is applied onto the core pipe (1) on passing through a coating die (7), followed by cooling the applied coating layer (7a) before the readily coated pipe (9) is drawn out of the process. The method is characterized in that the degree of adhesion between core pipe (1) and coating layer (7a) is controlled by rapid and effective heating of the surface of the core pipe (1) to a predetermined temperature and by controlling welding time and stretching of the coating layer being applied onto the core pipe (1) by maintaining a controlled vacuum level inside the coating die (7) forcing the coating layer to hit the surface of the core pipe at an angle as steep as possibly, preferably between 45 and 90 degrees, most preferably between 60 and 80 degrees.

20 Claims, 2 Drawing Sheets

(56) References Cited

U.S. PATENT DOCUMENTS

Figure 1:
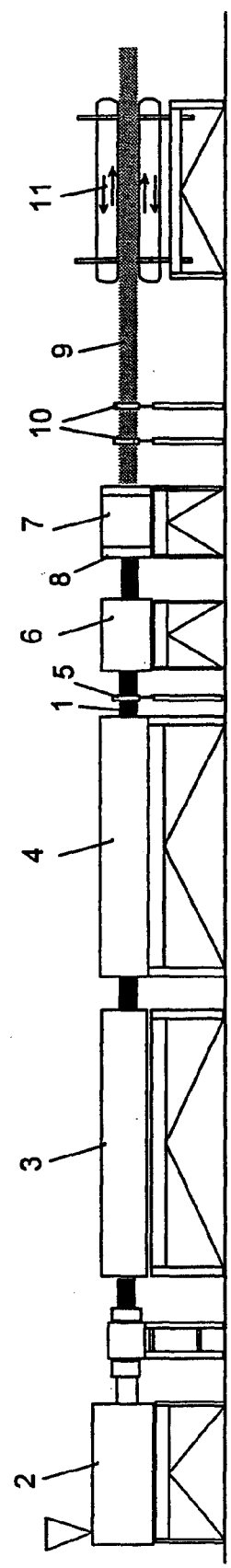

| | | | |
|---|---|---|---|
| 5,518,773 A * | 5/1996 | Shibata et al. | 427/356 |
| 2003/0166733 A1* | 9/2003 | Miyazaki et al. | 516/115 |
| 2006/0024445 A1* | 2/2006 | Willnow et al. | 427/294 |

FOREIGN PATENT DOCUMENTS

| | | | |
|---|---|---|---|
| GB | 2 392 221 | | 2/2004 |
| JP | 72009754 | * | 3/1972 |
| JP | 8-216222 | | 8/1996 |

* cited by examiner

METHOD FOR MANUFACTURING COATED PIPES

RELATED APPLICATIONS

This application is a national stage application (under 35 U.S.C. §371) of PCT/FI2006/050078 filed Feb. 23, 2006, which claims benefit of Finnish application 20050210 filed Feb. 23, 2005.

The invention concerns a method for manufacturing pipes coated with a peelable protection layer, wherein the core pipe is produced by extruding and calibrating, after which the surface of core pipe is heated before a protecting coating layer is applied onto the core pipe on passing through a coating die, followed by cooling the applied coating layer before the readily coated pipe is drawn out of the process.

Such coated pipes are suitable for applications, such as no-dig installations for instance guided drilling, where it is advantageous to have a supplementary protecting layer at the pipe. In order to enable jointing by electro welding of such coated pipes the outer protection layer has to be peelable and the adhesion between the core pipe and protecting outer layer must ensure that the protecting layer will not slide or tear away during handling of the pipe or when the pipe is installed.

Pipes provided with protecting layers have previously been manufactured either by co-extrusion or by a coating method. The general way to reach a sufficient adhesion between core pipe and coating has hereby been the use of materials partly weldable with each other or by adding some kind of glue or adhesion layer between the coating and the core pipe. If two weldable (e.g. PE-HD+PE-HD) or partly weldable (e.g. PE-HD+PP-copolymer) plastics are co-extruded a weaker controllable adhesion is reached by using a release layer between the layers or by using an additive or a filler in one of the layers. In a co-extrusion tool, also welding together of layers of two plastics having different melting temperatures, can be controlled by adjusting the temperature of one of the plastics in such a way that confluence of the flows of plastics inside the tool results in a desirable level of adhesion.

A drawback with co-extrusion in the production of pipes of the above mentioned type is that the boundary layer between the inner core pipe and the outer protection layer does not always comply with requirements of smoothness and roundness set up for electro welding. Said problem with the boundary layer, formed when two molten materials flow together, increases with increasing pipe diameter, whereby also the faulty eccentric running of pipes in connection with uneven core pipe surfaces may result in varying gaps between inner surface of an electro fusion socket and the outer surface of the core pipe. At a too wide gap the expanding material cannot provide a sufficient welding pressure and/or a sufficient welding time any more to ensure that the joint complies with the same requirements as the pipe.

Differing from co-extrusion a method, wherein the core pipe is manufactured first by extrusion and calibration, resulting in a core pipe having a smooth and completely round outer surface, and the outer surface of the core pipe is then heated before the core pipe is led through a coating die in order to apply a coating layer, will offer a pipe complying with the requirements for electro fusion jointing. Such a method is mentioned for instance in the publication GB 2 392 221 at page 12, but there is indicated that such a method is not preferred, because of the difficulty of maintaining a consistent adhesion between the inner core pipe and the outer protection layer.

The object of the present invention is to eliminate the above mentioned problem and to provide a uniform adhesion between the core pipe and the protecting layer in a coated pipe of the above mentioned type. This is achieved by controlling the degree of adhesion between core pipe and coating layer by rapid and effective heating of the surface of the core pipe to a predetermined temperature and by controlling welding time and stretching of the coating layer being applied onto the core pipe by maintaining a controlled vacuum level inside the coating die forcing the coating layer to hit the surface of the core pipe in an angle as steep as possible.

According to a preferred embodiment the core pipe is cooled in a water bath after the calibration, after which possible residue water is blown away from the surface of the core pipe for instance by leading the core pipe through a blowing ring directing high pressure air towards the surface of the core pipe around the whole periphery of said core pipe in a direction backwardly inclined towards the direction of motion of the core pipe.

In order to achieve a correct size specific and speed matched surface temperature to the core pipe, it is preferred to use a radiating heater, through which the dry and clean core pipe is led. The advantage with a radiating heater is that it provides a rapid, easily controllable and highly effective heating. If the temperature achieved in the radiating heater is too low or if it is turned off, no adhesion will be achieved between core pipe and applied coating. On the other hand a too high surface temperature of the core pipe will result in a risk that the applied coat would adhere to strongly to the core pipe or in that the surface of the core pipe would be oxidized whereby the adhesion again would be remarkably decreased. Due to this the control of the radiation effect is of great importance.

Other potential possibilities of heating of the core pipe are for instance the use of hot air blowers or saturated steam. If saturated steam is used the pipe must be blown dry by means of a further blowing ring before the coating die.

A rapid heating of the surface is preferred because then only the surface layer will be heated and the outer diameter of the pipe will remain nearly constant. If the heating is carried out in such a way that the whole pipe wall reaches a higher temperature, the heat expansion of the pipe will lead to a greater risk for the coating layer to get loose from the core pipe when the coated pipe is cooled to room temperature.

The effect of the radiating heater was confirmed by turning off said heater when all parameters were set and the pipe produced was of good quality, having sufficient adhesion between coating and core pipe. No other parameters were changed. The effect could immediately be seen as lack of adhesion between coating and core pipe.

The coating is extruded onto the heated surface of the core pipe when it is led through a coating die positioned as near the radiating heater as possible, in order to minimize possible heat lost and the influence of the environment upon the heated surface of the core pipe.

Because it is of considerable importance for the function of this method that the temperature of the coating material is sufficiently high, the distance the coating has to run from the extruder die to the surface of the core pipe has been minimized according to a preferred embodiment by the constructing the front of the extruder die in such a way, that the flow of coating material is directed more or less radially toward the core pipe to hit the core pipe at an angle between 45 and 90 degrees, preferably between 60 and 80 degrees.

By supplying coating material to the core pipe in this way the axial shrinking of the outer layer is reduced, too, which would be a problem especially when polyethylene is used as coating material.

A vacuum level in the coating die can preferably be maintained by means of an internal vacuum system, which further improves the end product, when the coating layer being applied onto the core pipe is "sucked" fast to the surface of the core pipe.

By controlling the vacuum level inside the coating die both the welding time, during which the molten material is in contact with the underlying core pipe in such a condition that the material layers adhere to each other and the stretching of the coating is controlled. The longer welding time the stronger adhesion between core pipe and coating is reached. By stretching the coating layer a new surface to be adhered to the core pipe is formed. Usually the level of adhesion is decreased if a stretching or orientation of the coating material takes place when a coating layer is applied.

It is also important to control the thickness and temperature of the surface coating, because the amount of heat present in the plastics material of the coating in combination with the speed the core pipe is run through the coating die define the welding time during which the temperature of the coating is at a level at which welding between the coating and the core pipe takes place and before the temperature of the material at the surface of the core pipe and the material in the coating layer has decreased to a level where no improvement of the adhesion takes place any more.

When the coated pipe leaves the coating die it has to be cooled, which preferably takes place by leading the pipe through a number of blowing rings being axially displaceable and having an adjustable cooling effect. Correct cooling is important for avoiding the end of the coating die and the applied coating from being cooled down too soon and simultaneously for ensuring that the coating is cooled down to a sufficient extent for not being damaged when the pipe comes into contact with a haul-off equipment at the end of the process.

In order to minimize the risk of oxidation at the surface of the heated plastics material in the coating die an inert gas such as nitrogen can be led through the coating die.

Figure 2:
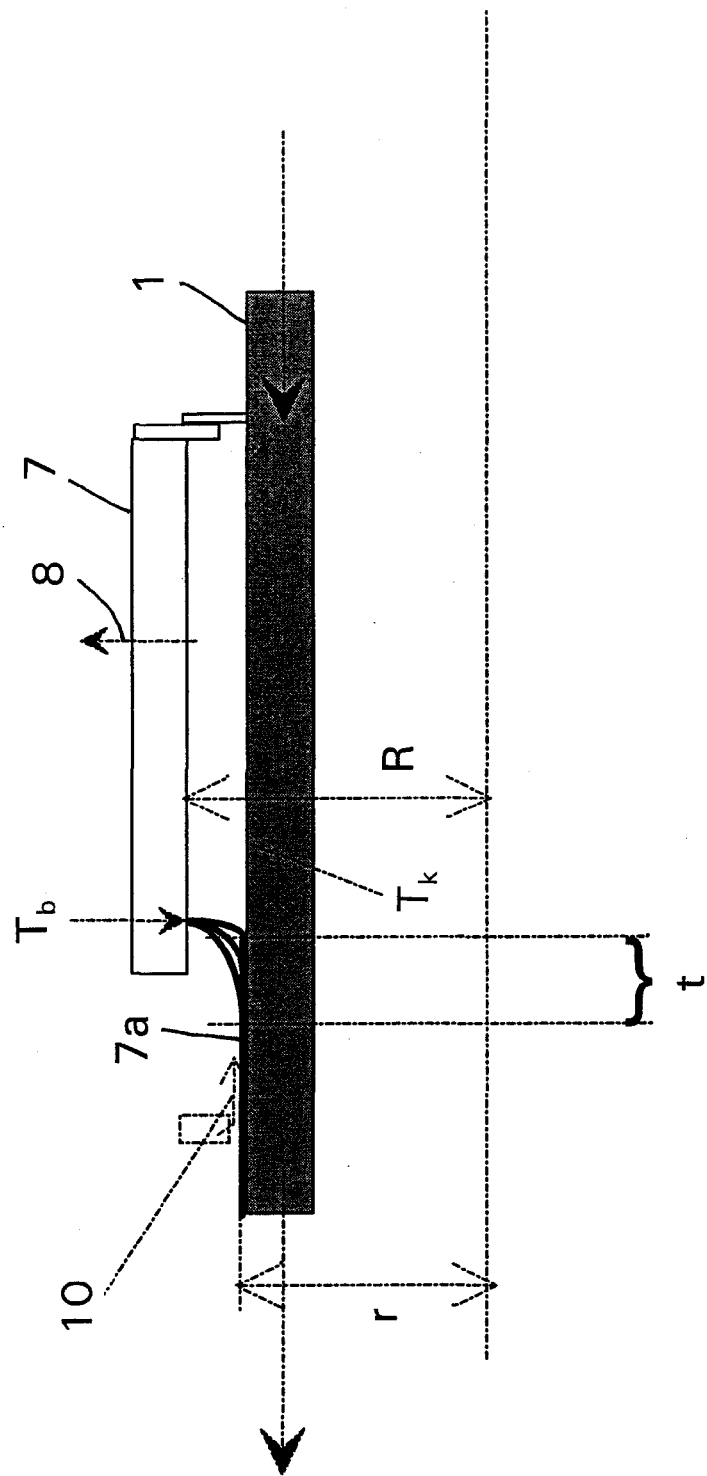

In the following the invention will be described in more detail with reference to the enclosed drawing, wherein FIG. 1 shows a schematic bock diagram of a preferred embodiment of the coating process according to the invention and FIG. 2 shows a schematic explanatory sketch of a part of a coating die during coating of a core pipe.

According to the invention a core pipe 1 is manufactured in a conventional way in an extruder 2, after which it is led through a calibrator 3, in order to adjust the size of the pipe, and subsequently through a water bath 4 for cooling the core pipe 1.

When the core pipe 1 leaves the water bath it is led through a blowing ring 5 in order to remove possible residue water from the surface of the core pipe 1, after which the core pipe with clean and dry surface is led through a radiating heater 6 for effective heating of the surface of the core pipe to a correct temperature, which is dimension specific, i.e. it is dependent of the diameter and wall thickness of the pipe and of the thickness of the coating layer 7a to be applied onto the core pipe 1.

The coating layer 7a is applied onto the core pipe 1 in a coating die 7, positioned as near the radiating heater 6 as possible, through which die the core pipe 1 is led. The coating layer is extruded onto the surface of the core pipe 1 through channels in the coating die 7 ending substantially radially towards the surface of the core pipe 1. In order to further intensify the adhesion between the core pipe 1 and the applied coating layer 7a the coating die 7 is provided with an internal vacuum system 8 maintaining a vacuum in the coating die 7, so that the coating layer 7a is sucked to the surface of the core pipe 1 as rapidly as possible.

The coated pie 9 is then led through a number of blowing rings 10 being axially displaceable and having a controllable cooling effect. By means of these blowing rings 10 a correct cooling of the applied coating layer 7a is achieved before the coated pipe comes to a drawing device 11 in the final end of the process line. In this way the risk of damages at the coating layer 7a is eliminated. Simultaneously the welding time can be controlled by adjusting the blowing rings 10. If an extension of the welding time outside the coating die 7 is desired is it possible to lead hot air onto the coated pipe 9 through the blowing ring 10 closest to the coating die 7. Hereby the effective cooling of the coating layer 7a will not start until reaching next blowing ring 10.

The explanatory sketch in FIG. 2 shows, how the coating layer 7a is applied onto a heated core pipe 1 in a coating die 7. Heated coating material is led through channels in the coating die 7 ending substantially perpendicularly to the surface of the core pipe 1. Due to the fact that the core pipe 1 moves continuously through the coating die 7 the coating material does not hit the surface of the core pipe 1 quite radially but slightly obliquely in the moving direction of the core pipe, as indicated in FIG. 2. In order to have the coating layer 7a to be sucked to the core pipe 1 more rapidly vacuum is arranged inside the coating die 7, whereby the coating material, depending on the vacuum level will hit the core pipe 1 at a steeper angle. A third way to control the adhesion between the coating layer 7a and core pipe 1 is to stretch the coating layer 7a simultaneously as it is applied onto the core pipe 1. FIG. 2 shows how the coating layer 7a hits the core pipe 1 in three different settings of the vacuum level. The faster, i.e. the steeper angle at which the coating material hits the surface of the core pipe 1 the longer welding time t and the stronger adhesion between coating layer 7a and core pipe 1 is achieved. Another possibility to extend the welding time is to lead hot air towards the coated pipe 9 from the first blowing ring 10, as illustrated by dotted lines in FIG. 2.

The adhesion can be defined as a function of at least the Draw Down Ratio (DDR) which is the ratio between final outer pipe diameter 2r and the inner diameter R2 of the coating die 7, the surface temperature $T_k$ of the core pipe 1, the temperature $T_b$ of the coating material, the welding time t and the thickness of the coating layer 7a.

When stretching, the molecules are oriented axially with the core pipe. Welding together of an oriented material layer is weaker because the molecules do not have the same mobility perpendicularly to the orientation in comparison to a non-stretched material.

The invention claimed is:

1. A method for manufacturing a pipe coated with a peelable protection layer, the method comprising:
    producing a solid core pipe by extrusion and calibration;
    heating, after the producing, the solid surface of the core pipe to a predetermined temperature, wherein the speed and effectiveness of the heating is controlled to create a desired degree of adhesion between the core pipe and a protective coating layer; passing the heated solid core pipe through a coating die;
    applying, during the passing, the protective coating layer to the heated core pipe;
    controlling the pressure inside the coating die within a range of vacuum pressures such that the pressure causes the coating layer to contact the surface of the core pipe at an angle between 45 to 90 degrees, and
    cooling the applied coating layer;

wherein the welding time and stretching of the coating layer as it is applied to the core pipe is controlled at least in part by the maintaining a vacuum level.

2. Method according to claim 1, wherein the welding time is adjusted by controlling the thickness and temperature of the coating layer and the rate of the core pipe through the coating die.

3. Method according to claim 1, wherein the core pipe is cooled in a water bath after the calibration, after which possible residue water is blown away from the surface of the core pipe by leading the core pipe through a blowing ring.

4. Method according to claim 3, wherein the welding time is adjusted by controlling the thickness and temperature of the coating layer and the rate of the core pipe through the coating die.

5. The method of claim 3, wherein the vacuum level is adjustable, and the maintaining comprises adjusting the vacuum level to adjust the welding time and stretching of the coating layer.

6. Method according to claim 3, wherein the heating of the surface of the core pipe is carried out by leading the pipe through a radiating heater offering a rapid, controllable and highly effective heating.

7. Method according to claim 6, wherein the welding time is adjusted by controlling the thickness and temperature of the coating layer and the rate of the core pipe through the coating die.

8. Method according to claim 6, wherein the coating die is positioned as near the radiating heater as possible.

9. Method according to claim 8, wherein an inert gas is led through the coating die in order to minimize the risk of oxidation at the surface of the heated plastics material.

10. Method according to claim 9, wherein the welding time is adjusted by controlling the thickness and temperature of the coating layer and the rate of the core pipe through the coating die.

11. Method according to claim 8, wherein the welding time is adjusted by controlling the thickness and temperature of the coating layer and the rate of the core pipe through the coating die.

12. Method according to claim 8, wherein the angle is between 60 and 80 degrees.

13. Method according to claim 8, wherein in the coating die the flow of coating material is directed more or less radially toward the core pipe to hit the core pipe at an angle between 45 and 90 degrees.

14. Method according to claim 13, wherein the welding time is adjusted by controlling the thickness and temperature of the coating layer and the rate of the core pipe through the coating die.

15. Method according to claim 13, wherein the vacuum level inside the coating die is maintained by means of an internal vacuum system.

16. Method according to claim 15, wherein the welding time is adjusted by controlling the thickness and temperature of the coating layer and the rate of the core pipe through the coating die.

17. Method according to claim 15, wherein the coated pipe (9) is led through two or more axially displaceable blowing rings (10) having an adjustable cooling effect.

18. Method according to claim 17, wherein the welding time is adjusted by controlling the thickness and temperature of the coating layer and the rate of the core pipe through the coating die.

19. Method according to claim 17, further comprising controlling of the welding time between the coating layer and the core pipe is carried out by blowing hot air onto the coated pipe when leaving the coating die.

20. Method according to claim 10, wherein the welding time is adjusted by controlling the thickness and temperature of the coating layer and the rate of the core pipe through the coating die.

* * * * *